(12) United States Patent
Yamauchi et al.

(10) Patent No.: US 6,798,395 B1
(45) Date of Patent: Sep. 28, 2004

(54) INFORMATION TERMINAL EQUIPMENT PROVIDED WITH BACKLIGHT

(75) Inventors: Atsushi Yamauchi, Kanagawa (JP); Masayuki Saito, Kanagawa (JP)

(73) Assignee: Kyocera Corporation (JP)

( * ) Notice: Subject to any disclaimer, the term of this patent is extended or adjusted under 35 U.S.C. 154(b) by 119 days.

(21) Appl. No.: 09/596,463

(22) Filed: Jun. 19, 2000

(30) Foreign Application Priority Data

Jun. 22, 1999 (JP) .......................................... 11-175546

(51) Int. Cl.[7] .............................................. G09G 3/36
(52) U.S. Cl. ................................................... 345/102
(58) Field of Search .......................... 345/102, 63, 211, 345/170; 350/345, 333; 250/205, 234; 455/574, 566, 550; 395/132; 379/21

(56) References Cited

U.S. PATENT DOCUMENTS

| | | | | |
|---|---|---|---|---|
| 4,896,370 A | * | 1/1990 | Kasparian et al. | 455/77 |
| 4,958,915 A | * | 9/1990 | Okada et al. | 350/345 |
| 5,285,058 A | * | 2/1994 | Goodwin | 250/205 |
| 5,315,695 A | * | 5/1994 | Saito et al. | 395/132 |
| 5,384,577 A | * | 1/1995 | McLaughlin et al. | 345/102 |
| 5,770,856 A | * | 6/1998 | Fillard et al. | 250/234 |
| 5,809,449 A | * | 9/1998 | Harper | 702/63 |
| 5,818,553 A | * | 10/1998 | Koenck et al. | 349/61 |
| 5,844,530 A | * | 12/1998 | Tosaki | 345/8 |
| 5,854,617 A | * | 12/1998 | Lee et al. | 345/102 |
| 5,903,624 A | * | 5/1999 | Boswell et al. | 379/21 |
| 5,963,253 A | * | 10/1999 | Dwyer | 348/362 |
| 5,983,073 A | * | 11/1999 | Ditzik | 455/11.1 |
| RE36,712 E | * | 5/2000 | Sato et al. | 455/550 |
| 6,107,985 A | * | 8/2000 | Walukas et al. | 345/102 |
| 6,119,023 A | * | 9/2000 | Tomiyori | 455/574 |
| 6,256,007 B1 | * | 7/2001 | Walukas et al. | 345/102 |
| 6,278,887 B1 | * | 8/2001 | Son et al. | 455/566 |
| 6,281,812 B1 | * | 8/2001 | Kim | 341/23 |
| 6,310,609 B1 | * | 10/2001 | Morgenthaler | 345/170 |
| 2002/0142808 A1 | * | 10/2002 | Abbasi | 455/566 |

FOREIGN PATENT DOCUMENTS

| | | |
|---|---|---|
| CN | 1198539 A | 11/1998 |
| CN | 1214833 A | 4/1999 |
| JP | 4-343529 | 11/1992 |
| JP | 11-154900 A | 6/1999 |

OTHER PUBLICATIONS

Robert Cowart, Mastering Windows 3.1, 1992, Sybex Inc., p. 178, 179.*
The First Office Action from the State Intellectual Property Office of People's Republic of China (translation).

* cited by examiner

*Primary Examiner*—Amare Mengistu
*Assistant Examiner*—Prabodh M. Dharia
(74) *Attorney, Agent, or Firm*—Schulte Roth & Zabel; Joel E. Lutzker; John C. Garces

(57) ABSTRACT

An information terminal device comprises a backlight for illuminating a key operation portion or a LCD display portion; an optical sensor portion for detecting lightness of the surroundings; a backlight control for turning on illumination light according to surrounding light for a fixed time after key operation; and an optical sensor control for applying electric power to the optical sensor portion at regular intervals thereby to detect the surrounding light, wherein the application of the electric power to the optical sensor portion is forbidden except when the surrounding light is detected. Further, the backlight control switches, according to the surrounding light when the key operation is performed, control in which both the key operational portion backlight and the LCD backlight are turned on, control in which only the LCD backlight is turned on, and control in which both of the backlights are not turned on.

4 Claims, 4 Drawing Sheets

US 6,798,395 B1

INFORMATION TERMINAL EQUIPMENT PROVIDED WITH BACKLIGHT

BACKGROUND OF THE INVENTION

The present invention relates to an information terminal device provided with a backlight, such as a mobile radio equipment.

Conventionally, an information terminal device such as a mobile radio equipment, as disclosed in, for example, JP-A-4-343539, includes a lighting means for illuminating an operational portion such as a number key, a function key or the like, and a number display, and further includes a lighting device for lighting the lighting means for a predetermined time by key operation. This lighting device includes a timer which is actuated for a predetermined time to light the lighting means every time the key is operated, and an optical sensor portion which detects light amount of the surroundings while the timer is actuated. Further, the lighting device includes an electric current control means which controls amount of driving electric current flowing in the lighting means according to the light receiving amount and which shuts off the driving electric current when the detected light amount of the surroundings exceeds the predetermined amount.

The conventional lighting device of the information terminal device such as the mobile radio equipment is constructed as described above. Therefore, when the key of the key operational portion is pushed down, the electric supply to the optical sensor portion is being performed together with the illumination light of the backlight for a predetermined time, so that more electric power of a battery is consumed than the device needs. Particularly, in a special mode requiring the large number of key operations, such as registration of telephone number, input of character message and the like, the electric power is still being supplied to the optical sensor portion, so that there is a problem that unnecessary electric power is consumed from the battery.

Further, it is necessary to separately provide a base plate for optical sensor in order to detect the surrounding light or to guide the surrounding light to an optical sensor on a common base plate by an optical guide, so that an extra space is required and cost-up is caused.

SUMMARY OF THE INVENTION

In order to solve the above problems, the invention has been made. An object of the invention is to provide a backlight control system of an information terminal device such as a mobile radio equipment, which does not consume the unnecessary electric power, and is superior in operational ability, visual recognizability and portability.

In order to achieve the above object, the information terminal device of the invention comprises a backlight means for illuminating a key operational portion or a LCD display portion, an optical sensor portion for detecting lightness of the surroundings, a backlight control means for lighting an illumination light according to the surrounding light for a predetermined time after the key operation, and an optical sensor control means which applies an electric current to the optical sensor portion at every regular intervals to detect the surrounding light. Except when the surrounding light is detected, application of the electric current to the optical sensor portion is forbidden.

Further, the information terminal device of the invention comprises a backlight means for illuminating a key operational portion or a LCD display portion, an optical sensor portion which is provided adjacently to a terminating LED and detects lightness of the surroundings, a backlight control means for adjusting the illumination light according to the surrounding light, an optical guide which guides the light of the terminating LED to the outside to perform terminating display at the terminating time and guides the surrounding light to the optical sensor at the illumination controlling time.

Further, the information terminal device of the invention comprises a key operational portion backlight means for illuminating a key operational portion, a LCD backlight means for illuminating a LCD display portion, a battery residual amount detecting means for detecting amount of the residual battery, and a backlight control means for adjusting the illumination light according to the battery residual amount.

Further, the information terminal device of the invention comprises a key operational portion backlight means for illuminating a key operational portion, a LCD backlight means for illuminating a LCD display portion, an optical sensor portion for detecting lightness of the surroundings, and a backlight control means for adjusting the illumination light according to the surrounding light. The backlight control means switches, according to the surrounding light when the key operation is performed, control for lighting both the key operational portion backlight means and the LCD backlight means, control for lighting only the LD backlight means, and control for not lighting all backlight means.

DETAILED DESCRIPTION OF THE PREFERRED EMBODIMENTS

The detail of the invention will be described below with reference to drawings.

\<First Embodiment\>

Figure 1:
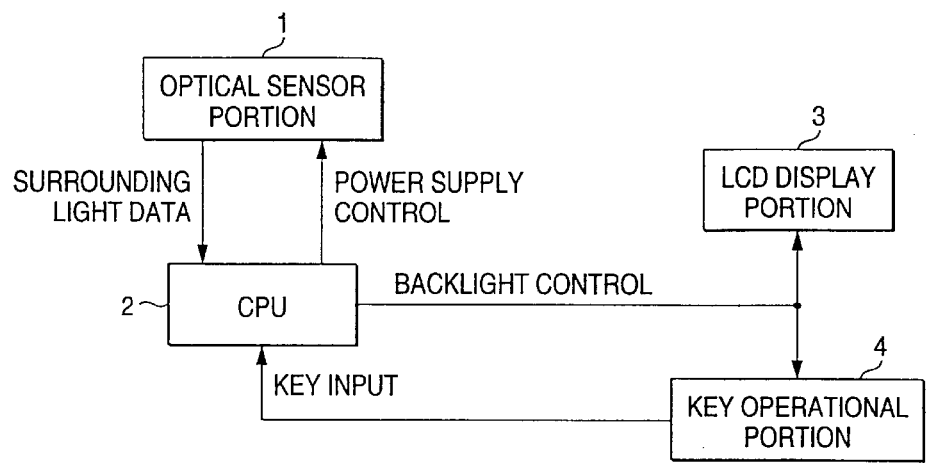
FIG. 1 is a block diagram of an information terminal device of the invention.

FIG. 1 is a block diagram of a backlight control means of an information terminal device according to the invention. In FIG. 1, reference numeral 1 is an optical sensor portion for detecting lightness of the surroundings, 2 is a CPU for performing input of several data and control of the information terminal device such as sensor power supply control, backlight control and the like, 3 is a LCD display portion comprising a LCD for displaying information and a backlight illuminating light, and 4 is a key operational portion comprising data input key such as a number key, a function key and the like, and a backlight illumination.

Figure 2:
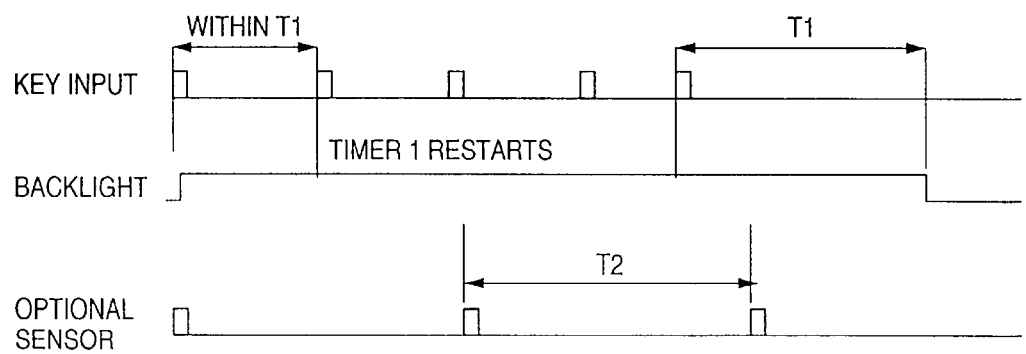
FIG. 2 is a timing diagram showing controls of key input, backlight, and optical sensor according to a first embodiment.

FIG. 2 is a timing diagram showing controls of key input, backlight and light sensor.

In FIG. 1, when any one of keys in the key operational portion 4 is pushed down, the CPU 2 detects key-input and sends a power supply control signal for switching on the power supply to the optical sensor portion 1 to cause the optical sensor portion 1 to detect lightness of the surrounding light. Further, the CPU 2 actuates a timer 1 for backlight illumination time and a timer 2 for optical sensor power supply control period. The timer 1 operates only for a specified time T1 and the CPU 2 controls the backlights of the LCD display portion and the key operational portion during the operation time of the timer 1. The timer 2 operates at a specified period T2, and the CPU 2 switches on the power supply of the optical sensor portion 1 at every periods T2 and reads the light detecting result of the surrounding light.

When the timer 2 is actuated by pushing down the key, the power supply of the optical sensor portion 1 is switched on and the optical sensor portion operates to detect the surrounding light. When the CPU2 reads the detected lightness of the surrounding light, it switches off the power supply of the optical sensor portion 1, so that consumption of a battery is suppressed to a minimum. Simultaneously, the CPU 2 actuates the timer 1, and sets and controls the lightness of the backlight according to the lightness of the surrounding light. Further, when the surrounding lightness detected by the optical sensor portion 1 is enough to perform reading of the LCD display portion 3 and the operation in the key operational portion 4, the CPU controls the backlight so that the electric current to the backlight is shut off.

After the timer 1 is actuated, when the key in the key operational portion is pushed down within the specified time T1, the timer 1 is reset and restarted. When the key is pushed down within the time T1 in this manner, the timer 1 does not reach the time T1 and the backlight continues illumination. Particularly, when the large number of the key operations such as registration of telephone number, input of character message and the like is required, the key operations are sequentially performed. Therefore, the backlight continues according to the key operations.

When the time T1 passes after the key operation, since the timer 1 reaches the specified time, it shuts off the electric current to the backlight, stops the operation of the timer 2 and is on standby till a next key operation. On the other hand, the timer 2 operates at the period T2. While the timer 1 operates, that is, while the timer 1 controls the backlight, when the timer 2 reaches the time T2, the timer 2 switches on the power supply of the optical sensor portion 1 again independently of the key operation, reads the lightness of the surrounding light, and then switches off the power supply of the optical sensor portion. Further, the lightness of the backlight is set and controlled according to the detected lightness of the surrounding light. Every time the timer 2 reaches the period T2, the power supply of the optical sensor portion 1 is switched on in this manner, and the optical sensor portion 1 detects the surrounding light and controls the lightness of the backlight. Further, when the surrounding lightness detected by the optical sensor portion 1 is light enough to perform reading of the LCD display portion 3 and the operation in the key operational portion 4, the optical sensor portion 1 controls the application of the electric current to the backlight so that the electric current is shut off. This operation is performed at the period T2 specified by the timer 2 while the timer is operating, that is, while the backlight is controlled.

As described above, according to the first embodiment, the supply of the electric power to the optical sensor portion is performed at every fixed periods to detect the surrounding light, and the lightness of the backlight in the LCD display portion and in the key operational portion is controlled according to the lightness of the surrounding light. Therefore, it is possible to provide operational environment in which an operator is easy to operate the device and display environment in which he is easy to see the device, and it is also possible to reduce the consumption electric power. Particularly, the effect of the invention is remarkable in a special mode requiring a large number of key operations, such as registration of telephone number, input of character message, and the like, so that the electric power conventionally consumed in the optical sensor portion can be reduced sharply.

<Second Embodiment>

Figure 3:
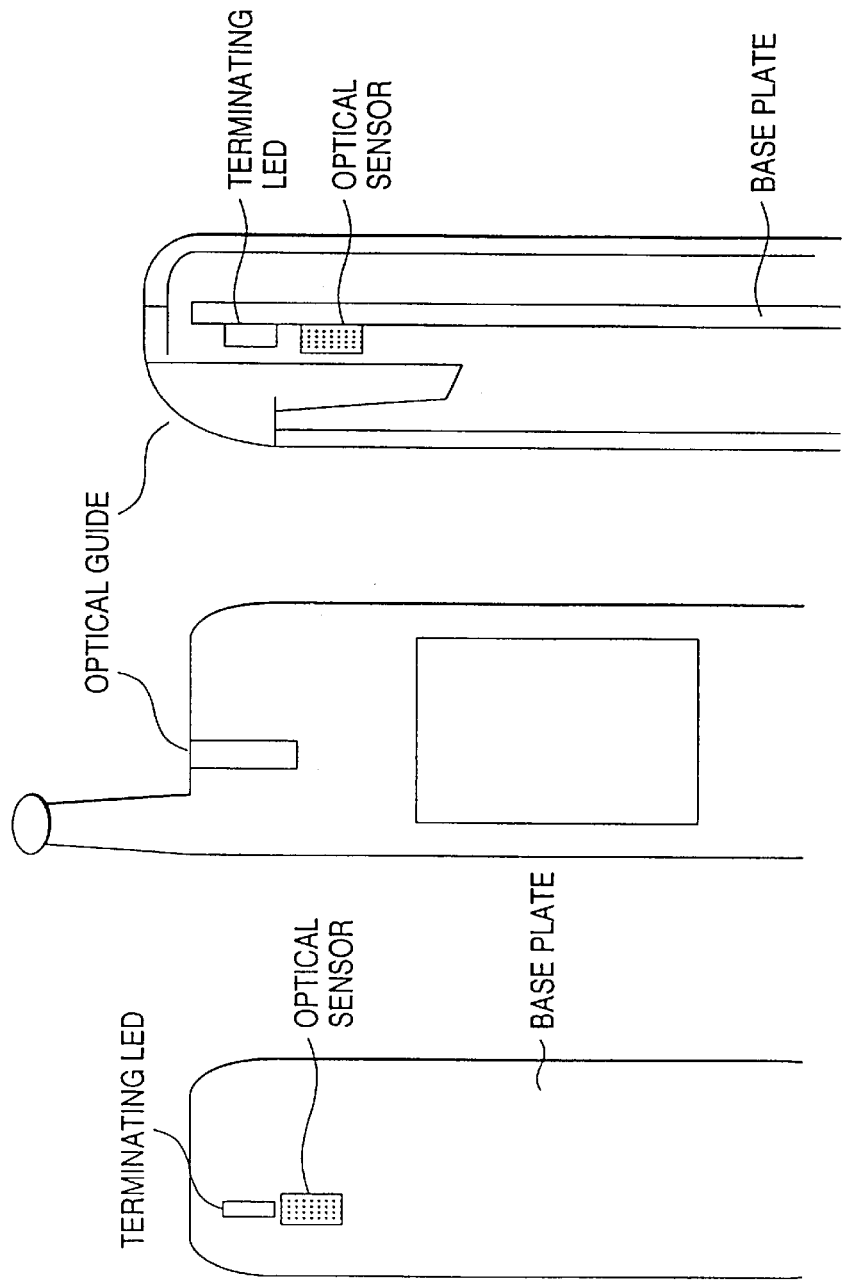
FIG. 3 is an arrangement diagram of terminating LED, optical sensor and an optical guide according to a second embodiment.

FIG. 3 is an arrangement diagram showing an arrangement example of a terminating LED, an optical sensor, and an optical guide in a mobile telephone according to a second embodiment. As shown in FIG. 3, in an information terminal equipment such as a mobile telephone or the like provided with a backlight device for illuminating a key operational portion 4 or a LCD display portion 3, an optical sensor portion 1 for detecting lightness of the surroundings, and a backlight control means which controls the backlight device according to the surrounding light and adjusts the illumination light, an optical sensor is arranged adjacently to a terminating LED that displays terminating to constitute an optical sensor portion. Herein, when the terminating call in the mobile telephone exists, the light of the terminating LED is guided to the outside by one optical guide to perform the terminating display, and the surrounding light is guided to the optical sensor at the backlight control time, whereby the mobile telephone is miniaturized.

Further, regarding detection of the surrounding light, while the terminating LED is turned on and off (turned on), the detection of the surrounding light is forbidden, and it is performed after the terminating LD is turned off, whereby the lightness of the surroundings can be accurately detected even if the optical sensor is arranged adjacently to the terminating LED.

Though conventionally, the terminating LED and the optical sensor portion were separately provided, according to the above embodiment, the optical sensor is arranged adjacently to the terminating LED, the light is guided to the outside by one optical guide, and the surrounding light is detected. Therefore, the consumption electric power can be reduced, and miniaturization and cost down can be achieved.

<Third Embodiment>

Figure 4A:
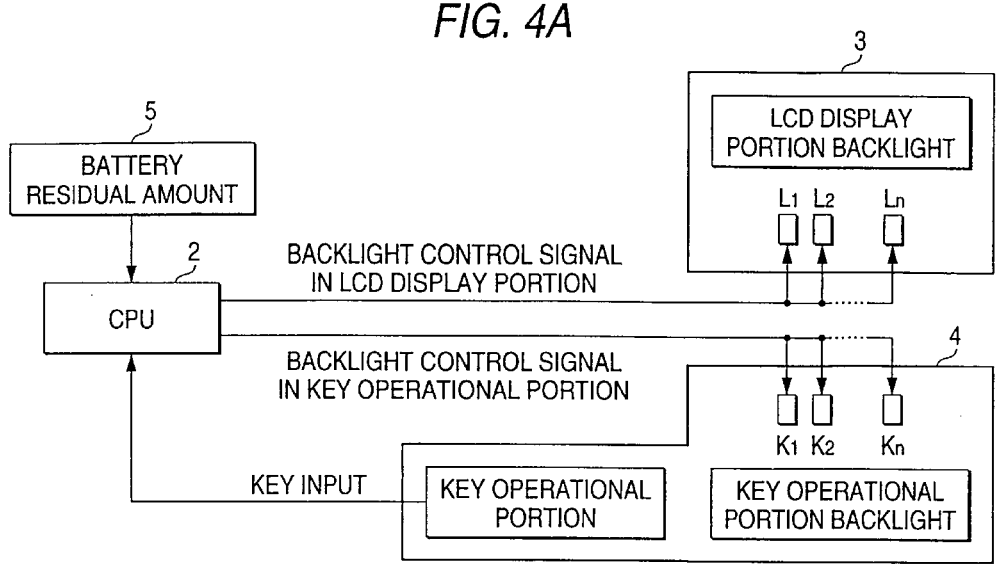
FIG. 4 is a block diagram of an information terminal device according to a third embodiment, and a flowchart of its control.

FIG. 4 is a block diagram of an information terminal device according to a third embodiment and a flowchart thereof. In FIG. 4, reference 5 is a battery residual amount detecting portion for detecting amount of the residual battery, 2 is a CPU for performing input of various data and control of the information terminal device such as backlight control, 3 is a LCD display portion comprising a LCD for displaying data and a backlight illumination (L1, L2, . . . Ln), and 4 is a key operational portion comprising a data input key such as a number key, a function key and the like, and backlight illumination (K1, K2, . . . Kn).

The backlight in the LCD display portion 3 comprises a plurality of light emitting elements (L1, L2, . . . Ln), and they can individually perform light emitting control according to LCD display portion backlight control signals from the CPU. Similarly, the backlight in the key operational portion 4 also comprises a plurality of light emitting element (k1, K2, . . . Kn), and they can individually perform light emitting control according to key operational portion backlight control signals from the CPU.

Figure 4B:
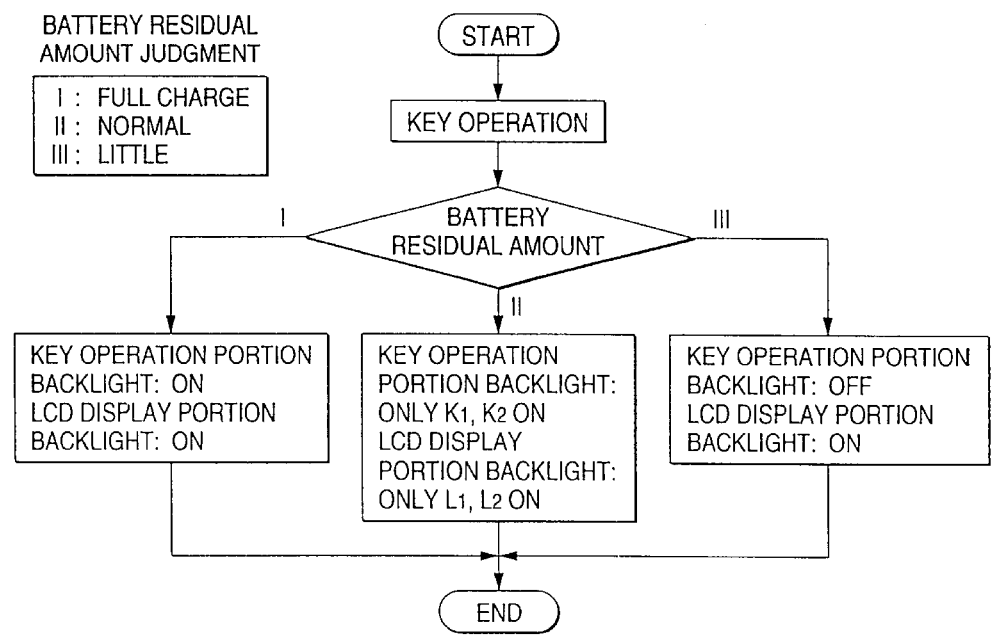

Referring to FIG. 4B, the backlight control will be described. When any one of the keys in the key operational portion 4 is pushed down, the CPU 2 detects key input and causes the battery residual amount detecting portion to judge the battery residual amount. In case that the battery residual amount is judged full charge, all of the light emitting elements in both the LCD display portion 3 and the key operational portion 4 are turned on. In case that the battery residual amount is judged to be smaller than a predetermined value, only the light emitting elements L1, L2 in the backlight of the LCD display portion 3 and the light emitting elements K1, K2 in the backlight of the key operational portion 4 emit the light. Further, in case that the battery residual amount is judged to be smaller than a second predetermined value that is smaller than the above predetermined value, the backlight of the key operational portion 4 is not turned on but the only the backlight of the LCD display portion 3 is turned on.

According to the above embodiment, the lightness of the backlight can be adjusted according to the battery residual amount, so that the electric power of the battery can be utilized for a long time.

<Fourth Embodiment>

Figure 5A:
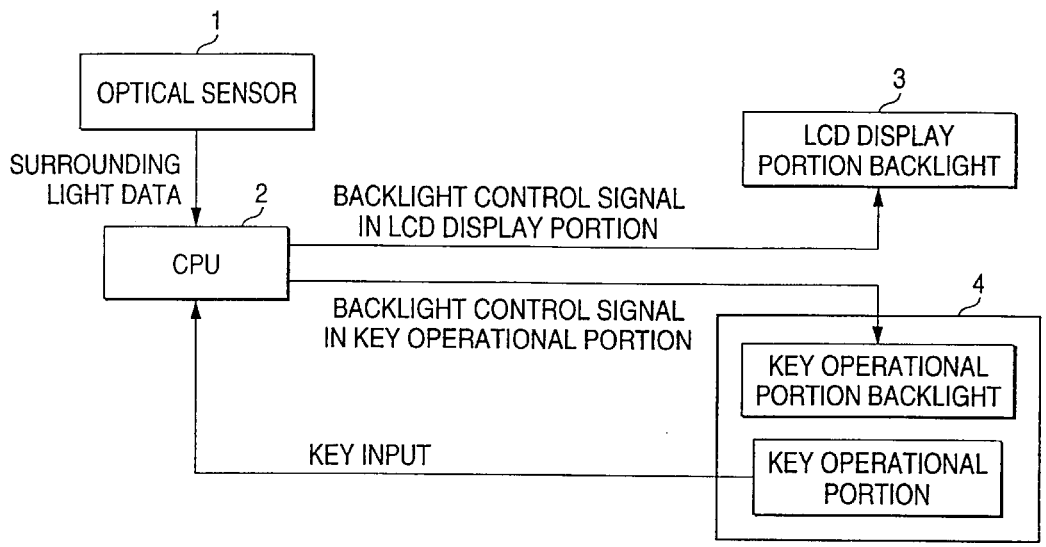
FIG. 5 is a block diagram of an information terminal device according to a fourth embodiment, and a flowchart of its control.

FIG. 5 is a block diagram of an information terminal device according to a fourth embodiment and a flowchart thereof. In FIG. 5, reference 1 is a battery residual amount detecting portion for detecting amount of the residual battery, 2 is a CPU for performing input of various data and control of the information terminal device such as backlight control, 3 is a LCD display portion comprising a LCD for displaying data and a backlight illumination, and 4 is a key operational portion comprising a data input key such as a number key, a function key and the like, and backlight illumination.

The backlight in the LCD display portion 3 and the backlight in the key operational portion 4 can be individually controlled according to backlight control signals from the CPU.

Figure 5B:
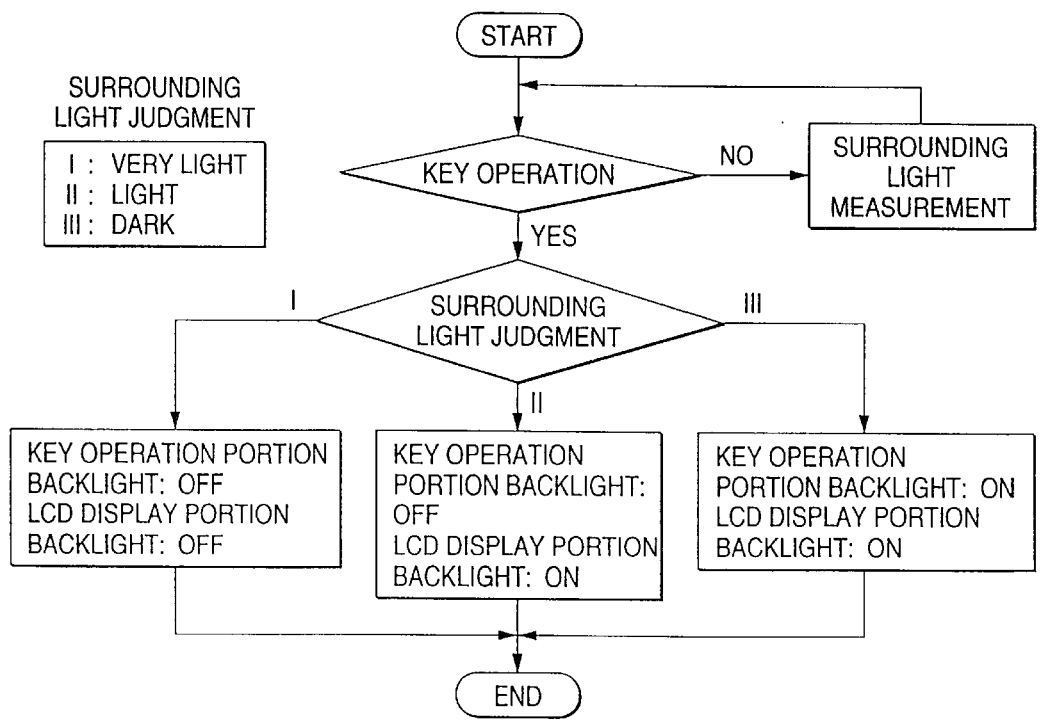

Referring to FIG. 5B, the backlight control will be described. When any one of the keys in the key operational portion 4 is pushed down, the CPU 2 detects the key input and judges the lightness of the surrounding light in the optical sensor portion. In case that the CPU judges that the surroundings are so light that the backlight is not required, it turns off the backlights in both the LCD display portion 3 and the key operational portion 4. In case that the CPU judges that the surroundings are so light that the key operation can be performed, it does not turn on the backlight in the key operational portion 4 but turns on only the backlight in the LCD display portion 3. Further, in case that the CPU judges that the surroundings are not light enough, it turns on the backlights in both the LCD display portion 3 and the key operational portion 4.

According to the above embodiment, in case that the surroundings are so light that it is not necessary to turn on the backlights, the backlights are not turned on. On the other hand, in case that the surroundings are so light that the key operation can be performed, only the backlight in the LCD display portion 3 can be turned on. Hereby, it is possible to prevent unnecessary consumption of the battery electric power.

According to the above embodiments, the lightness of the backlight can be adjusted according to the battery residual amount. Therefore, the electric power of the battery can be utilized for a long time.

What is claimed is:

1. An information terminal device comprising:

backlight means for illuminating a key operational portion or a LCD display portion; an optical sensor portion for detecting lightness of the surroundings;

backlight control means for turning on illumination light according to surrounding light for a fixed time after key operation; and optical sensor power supply control means for applying electric power to said optical sensor portion at regular intervals thereby to detect the surrounding light, wherein the electric power to said optical sensor portion is only applied during when the surrounding light is detected.

2. An information terminal device comprising:

backlight means for illuminating a key operational portion or a LCD display portion;

an optical sensor portion which is provided adjacently to a terminating LED and detects lightness of the surroundings;

backlight control means for adjusting illumination light according to surrounding light; and an optical guide which performs terminating display by guiding light of a terminating LED to the outside at the terminating time and guides the surrounding light to said optical sensor at the illumination control time.

3. An information terminal device comprising:

key operational portion backlight means for illuminating a key operational portion;

LCD backlight means for illuminating a LCD display portion;

battery residual amount detecting means for detecting amount of the residual battery; and backlight control means for adjusting illumination light according to the battery residual amount, wherein both the key operational portion backlight means and the LCD backlight means are turned on when the battery residual amount is equal to or larger than a first predetermined value, both the key operational portion backlight means and the LCD backlight means are turned off when the battery residual amount is smaller than a second predetermined value, wherein the first predetermined value is larger than the second predetermined value, and only the LCD backlight means is turned on when the battery residual amount is equal to or higher than the second predetermined value but lower than the first predetermined value.

4. An information terminal device comprising:

key operational portion backlight means for illuminating a key operational portion;

LCD backlight means for illuminating a LCD display portion;

an optical sensor portion for detecting lightness of the surroundings; and backlight control means for adjusting illumination light according to the surrounding light;

wherein said backlight control means switches, according to the surrounding light when the key operation is performed, control in which both the key operational portion backlight means and the LCD backlight means are turned off when the surrounding light is equal to or higher than a first level, control in which only the LCD backlight means is turned on when the surrounding light is equal to or higher than a second level but lower than the first level, and control in which all backlight means are turned on when the surrounding light is lower than the second level, wherein the first level represents a greater light than the second level.

* * * * *